United States Patent Office 3,212,640
Patented Oct. 19, 1965

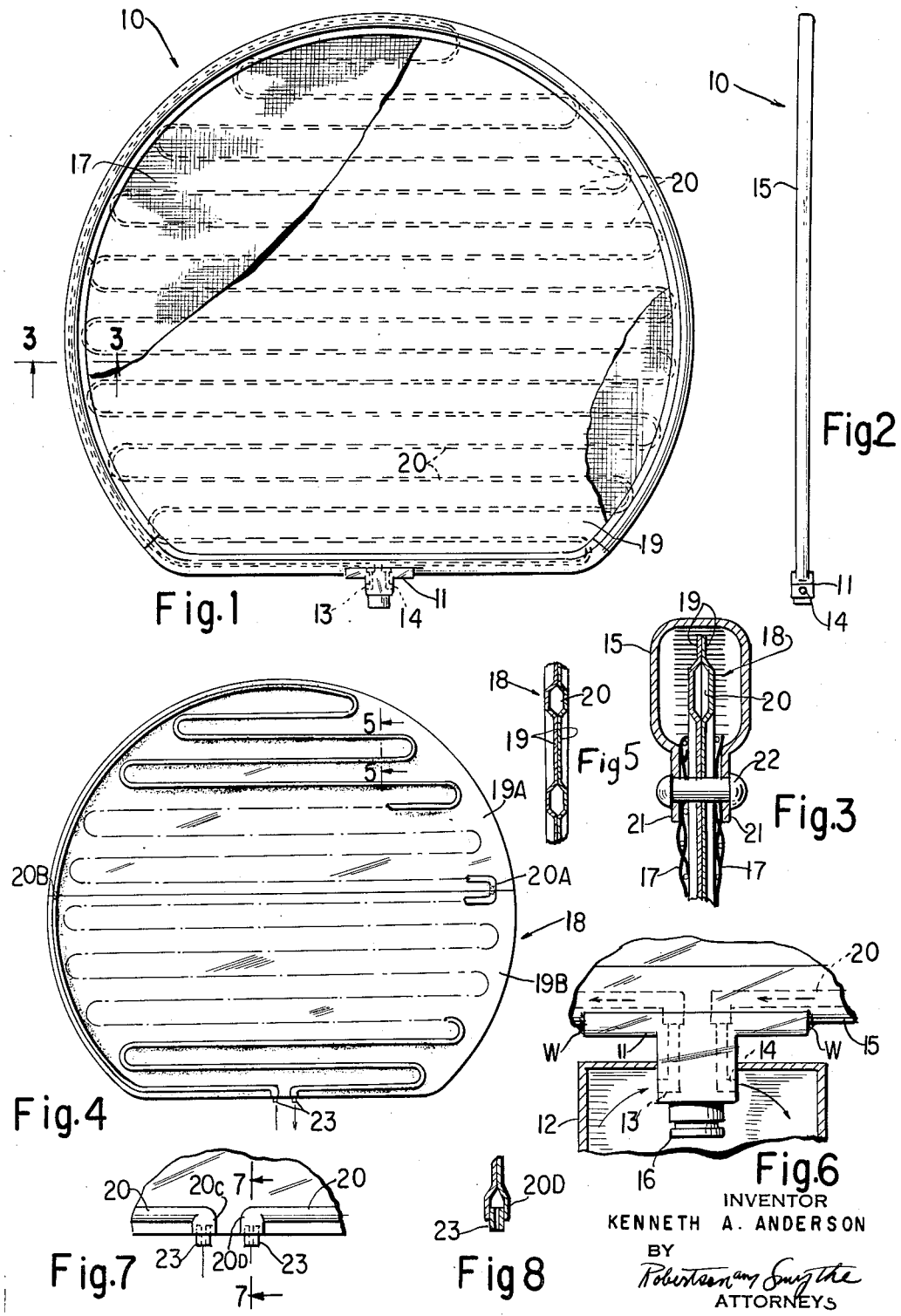

3,212,640
FILTER LEAF HAVING INTERNAL HEAT EXCHANGE MEANS
Kenneth A. Anderson, Silvis, Ill., assignor to Ametek, Inc., New York, N.Y., a corporation of Delaware
Filed Jan. 11, 1962, Ser. No. 165,640
1 Claim. (Cl. 210—185)

This invention relates to filtration apparatus and more particularly to filter leaf construction.

Winterizing processes for cotton seed oil or the like in which stearin is removed to produce a purified oil are performed at sufficiently cool temperatures to permit the stearin, but not the oil, to congeal or solidify. Filter leaf elements normally are positioned in a chilled filter tank upon which the chilled stearin fat builds up in cake form. The stearin must be removed from the filter element which requires heat to be applied thereto in order to melt or soften the same so that it can be removed.

Bent tubes within a leaf assembly have been used in the past but such have been difficult to position and to hold in position. Also, such a structure has been costly to build.

The principal object of the invention is to provide a filter leaf which can be manufactured at a minimum cost and which will have sufficient rigidity.

In one aspect of the invention, the filter leaf comprises an integral sheet of metallic material having heat conducting means formed therein and porous filtering means on at least one of its sides. A peripheral frame is provided having inwardly directed flanges enclosing edge portions of both the sheet and porous filtering means. Means are also provided clamping the flanges in such enclosing relationship.

In another aspect of the invention, the heat conducting means may be in the form of expanded tubular passages extending substantially throughout the integral metallic sheet and the remaining portions of the sheet may be of relatively thin, solid metal.

The foregoing and other objects, advantages and features of the invention will become apparent from the following detailed description with reference to the accompanying drawings, which are merely exemplary.

FIG. 1 is a side elevational view of a filter leaf construction embodying the principles of the invention;

FIG. 2 is a side elevational view of the filter leaf illustrated in FIG. 1;

FIG. 3 is a sectional view taken along line 3—3 of FIG. 1;

FIG. 4 is a view similar to FIG. 1 with certain parts removed to expose or illustrate the integral sheet of metallic material having an expanded tubular passage network;

FIG. 5 is a sectional view taken along line 5—5 of FIG. 4;

FIG. 6 is an enlarged view of a portion of the filter leaf of FIG. 1 illustrating the connecting means for inlet and outlet ducts;

FIG. 7 is a similar enlarged view of the duct connector portion of the filter leaf of FIG. 4; and FIG. 8 is a sectional view taken along the line 7—7 of FIG. 7 in the direction of the arrows.

The filter leaf generally shown at 10 (FIG. 1) is one of a plurality of like leaves each having welded or fastened thereto a bottom connector 11 that conveniently may be arranged or secured upon a conventional supporting manifold 12 (FIG. 6). The filter tank may have a suitable cooling jacket or cooling means to regulate the desired chilled temperature of cotton seed oil or other material delivered under pressure through an opening at one end of the tank. A manifold 12 may be rigidly mounted relative to the other end of the tank and as is known in the art, carriage means can be produced so that the leaves can be withdrawn from the tank for the purpose of cleaning the filter cake therefrom. The manifold is generally partitioned with longitudinal compartments, some of which have hydraulic or fluid connections that are adapted to connect the inlets 13 (FIG. 6) and outlets 14 of each filter leaf connector 11 with a supply of steam or other heating means for melting the material deposited on the leaf. One of the manifold compartments is usually employed for collecting filtrate that may have passed through the porous fabric of the filter leaves and collected within the peripheral frame 15 thereof for discharging through central passage 16 of the connector 11. A collecting means is also generally provided below the withdrawn unit for capturing the melted stearin filter cake which has other domestic uses.

The novel filter leaf construction, as viewed in FIGS. 1 and 3, includes an integral sheet 18 of metallic material, such as aluminum or an alloy thereof, formed having a thin, solid plate 19 interrupted by heat conducting expanded tubular passages 20 which may be of the pattern as illustrated in FIG. 1 having vertically spaced horizontally extending portions connected by reversely directed or U-shaped portions. A porous filtering means 17, fabric or wire mesh, is located on opposite sides of the integral metallic sheet, and a peripheral frame 15 having inwardly directed flanges 21 encloses the edges of both the metal sheet and the fabrics. The flanges and thin solid portions of the sheet have suitable aligned apertures at predetermined spaced intervals for reception of a rivet 22, bolt assembly or the like which clamps the elements as seen in FIG. 3 such that the fabrics stretch across the exterior surfaces of the tubular passages 20 and present a strong screen for passing the filtrate and to which the chilled stearin adheres upon filtering the cotton seed oil.

When there is sufficient filter cake residue or build-up upon the fabrics, resulting in a substantially reduced efficiency of filter operation, the unit supporting the vertically extending filter leaves is withdrawn from the chilled tank and, preferably, steam is delivered through a manifold passage and connector to the inlets 13 for circulation through the expanded tubular passage network to heat and melt the filter cake and thereby clean the filter leaves. By use of the novel filter leaves which have inherent ability to withstand any slanting or flexing, highly concentrated uneven cake build-up is obviated, thus permitting longer periods of efficient filter operation between leaf cleaning operations than can be attained when solid filter cake bridges across some of the leaves.

This uniform cake build-up tends to produce maximum overall filtering efficiency and a resultant reduction in overall cost of operation. The rigidity of the filter leaves also tends to eliminate undesirable distortions to the porous fabrics, thereby increasing the durable life thereof.

The integral filter plate shown in FIG. 4 illustrates the formation thereof from complementary sections 19A, 19B in which terminal portions of the expanded tubular passages are correspondingly aligned at 20A, 20B. Its heat conducting passages, enlarged in FIGS. 7, 8, have their inlet 20C and outlet 20D provided with, or silver soldered thereto, tubing inserts 23, the protruding portions of which are adapted for being silver soldered to the nozzles at the inboard end of inlet 13 and outlet 14 of the connector 11. As viewed in FIG. 6 the base of each connector 11 is welded at W to the external surface of the central bottom portion of the peripheral frame 15.

It should be apparent that modifications may be made in the construction and arrangement without departing from the spirit of the invention except as defined in the appended claim.

What is claimed is:

A filter leaf for use with chilled filtering apparatus, comprising an integral sheet of impervious metallic material having heat conducting channels being in the form of expanded tubular passages extending substantially throughout said integral impervious metallic sheet, the remaining portions of said sheet being of relatively thin, solid metal, a porous filtering means disposed at each side of said sheet and flatly engaging the outer faces of said channels adapted to pass a filtrate therethrough toward said sheet and collect a cake forming residue on the outer surfaces thereof, and means for withdrawing filtrate from between said filtering means, a peripheral channel-shaped frame having inwardly directed flanges enclosing the peripheral edge portions of both said sheet and porous filtering means, means on said periphery communicating with said expanded tubular passages for introducing and withdrawing heat exchange fluid into and from said passages, aligned apertures in said flanges and the peripheral edges of said sheet and filtering means, and clamping means extending through said apertures for clamping said sheet and filtering means together in enclosing relationship.

References Cited by the Examiner

UNITED STATES PATENTS

| | | | |
|---|---|---|---|
| 586,593 | 7/97 | Chamberlain | 210—185 |
| 1,381,944 | 6/21 | Sweetland | 210—346 X |
| 2,039,593 | 5/36 | Hubbuch et al. | 165—170 |
| 2,468,296 | 4/49 | Jacobowitz et al. | 210—486 |
| 2,934,322 | 4/60 | Hazard | 165—170 X |
| 2,943,738 | 7/60 | Schmidt | 210—185 |

REUBEN FRIEDMAN, *Primary Examiner.*

HERBERT L. MARTIN, *Examiner.*